United States Patent
Chen et al.

(10) Patent No.: US 10,832,397 B2
(45) Date of Patent: Nov. 10, 2020

(54) METHOD OF ASSISTING ANALYSIS OF RADIATION IMAGE AND SYSTEM USING THE SAME

(71) Applicant: Nuctech Company Limited, Beijing (CN)

(72) Inventors: Zhiqiang Chen, Beijing (CN); Yuanjing Li, Beijing (CN); Xianghao Wu, Beijing (CN); Jundi Dai, Beijing (CN); Yange Du, Beijing (CN); Limin Liu, Beijing (CN)

(73) Assignee: NUCTECH COMPANY LIMITED, Beijing (CN)

( * ) Notice: Subject to any disclaimer, the term of this patent is extended or adjusted under 35 U.S.C. 154(b) by 269 days.

(21) Appl. No.: 15/804,195

(22) Filed: Nov. 6, 2017

(65) Prior Publication Data

US 2018/0150951 A1 May 31, 2018

(30) Foreign Application Priority Data

Nov. 25, 2016 (CN) .......................... 2016 1 1063567

(51) Int. Cl.
*G06K 9/46* (2006.01)
*G06T 7/00* (2017.01)
(Continued)

(52) U.S. Cl.
CPC ............ *G06T 7/001* (2013.01); *G01V 5/0008* (2013.01); *G06K 9/46* (2013.01); *G06K 9/6202* (2013.01);
(Continued)

(58) Field of Classification Search
CPC ........... G06T 7/001; G06T 2207/30232; G06T 2207/10116; G06K 9/6267; G06K 9/6215; G06K 9/6202; G06K 9/46
See application file for complete search history.

(56) References Cited

U.S. PATENT DOCUMENTS

2008/0062262 A1* 3/2008 Perron ................. G01V 5/0008
348/82
2012/0281911 A1* 11/2012 Fung .................. G06K 9/00228
382/165
(Continued)

FOREIGN PATENT DOCUMENTS

CA          2 525 997 A1    11/2006
CN          104237959 A     12/2014
(Continued)

OTHER PUBLICATIONS

Thomas Rogers et al. ("Automated X-ray Image Analysis for Cargo Security: Critical Review and Future Promise") (Year: 2016).*
(Continued)

*Primary Examiner* — Solomon G Bezuayehu
(74) *Attorney, Agent, or Firm* — Scully Scott Murphy & Presser (57) ABSTRACT

The present application relates to a method of assisting analysis of a radiation image and a system using the same, which belongs to the field of image processing. A method of assisting analysis of a radiation image includes: acquiring a radiation image to be analyzed; acquiring customs declaration information of the radiation image to be analyzed; acquiring a feature-matched historical image from a typical image library according to the radiation image to be analyzed; and/or acquiring a standard image and/or detailed customs declaration information of the standard image according to the customs declaration information of the radiation image to be analyzed. The method of assisting analysis of a radiation image and the system using the same may assist an image inspection person to judge whether or not the current radiation image carries violation items, whether or not a concealing or missing report occurs and so on.

20 Claims, 5 Drawing Sheets

(51) Int. Cl.
*G01V 5/00* (2006.01)
*G06K 9/62* (2006.01)
(52) U.S. Cl.
CPC ......... *G06K 9/6215* (2013.01); *G06K 9/6267* (2013.01); *G06K 2209/21* (2013.01); *G06T 2207/30232* (2013.01)

(56) References Cited

U.S. PATENT DOCUMENTS

2017/0140526 A1* 5/2017 Chen .................... G06K 9/3233
2018/0060814 A1* 3/2018 Seaman ............. G06Q 10/0838

FOREIGN PATENT DOCUMENTS

| CN | 104732205 A | 3/2015 |
| WO | 2004/090829 A1 | 10/2004 |
| WO | 2013/036735 A1 | 3/2013 |

OTHER PUBLICATIONS

European Extended Search Report dated Apr. 23, 2018 received in European Patent Application No. 17 20 1175.1.

* cited by examiner

METHOD OF ASSISTING ANALYSIS OF RADIATION IMAGE AND SYSTEM USING THE SAME

CROSS-REFERENCE TO RELATED APPLICATIONS

This application is based upon and claims priority to Chinese Patent Application CN 201611063567.9, filed on Nov. 25, 2016, the entire contents thereof are incorporated herein by reference.

TECHNICAL FIELD

The present disclosure generally relates to the field of radiation image analysis technology, and more particularly, to a method of assisting analysis of a radiation image and a system using the same.

BACKGROUND

Supervision is one of important functions of the customs, and an image inspection station, as a sole link contacting real products, among all business links supervised by the customs, plays a pivotal role in customs supervision. The inspection of containers in the past was time-consuming and laborious work. With the advent of a radiation imaging apparatus, the inspection of the container may be completed by examining the radiation images of the container, which achieves revolutionary non-invasive inspection. However, the image inspection work in the current stage mainly relies on experience of people. Besides, the image inspection work requires an image inspection person to observe carefully, and the intensity of the work is quite high. It takes quite a long time to completely finish inspecting one image, which also causes that the current image inspection faces following difficulties: lack of the image inspection persons, lack of capacity of the image inspection persons, and even error inspection and missing inspection caused by certain irregularities.

The analysis and processing of the radiation image not only requires a variety of complex processing on original images, but also requires the analysis ability of professionals, and both of them are indispensable. However, due to the rapid development of the global foreign trade economy, the amount of merchandise increases sharply. Even with more professionals and professional image software, the efficiency of image inspection still gradually shows weakness, and there is also no effective solution in the industry.

Accordingly, there is a demand for a new method of assisting analysis of a radiation image and a system using the same.

The above information disclosed in the BACKGROUND section is merely for enhancing understanding of the background of the present disclosure, thus, it may include information that does not constitute the prior art known to the ordinary skilled in the art.

SUMMARY

A method of assisting analysis of a radiation image and a system using the same disclosed by the present application may synthesize image information and customs declaration information, automatically provide an image analysis results for reference of the user, which may greatly improve the efficiency and accuracy of the image inspection.

Other features and advantages of the present disclosure will become apparent from the following detailed description, or in part, by practice of the present disclosure.

According to an aspect of the present disclosure, there is provided a method of assisting analysis of a radiation image, including: acquiring a radiation image to be analyzed; acquiring customs declaration information of the radiation image to be analyzed; acquiring a feature-matched historical image from a typical image library according to the radiation image to be analyzed; and/or acquiring a standard image and/or detailed customs declaration information of the standard image according to the customs declaration information of the radiation image to be analyzed.

In an exemplary embodiment of the present disclosure, the method further includes: acquiring risk prompt information of the radiation image to be analyzed.

In an exemplary embodiment of the present disclosure, the acquiring a feature-matched historical image from a typical image library according to the radiation image to be analyzed includes: performing image retrieval on the radiation image to be analyzed in the typical image library.

In an exemplary embodiment of the present disclosure, the performing image retrieval on the radiation image to be analyzed in the typical image library further includes: training the image retrieval by using an intelligent learning algorithm.

In an exemplary embodiment of the present disclosure, the performing image retrieval on the radiation image to be analyzed in the typical image library includes: returning at least one type of image information according to a preset confidence level.

In an exemplary embodiment of the present disclosure, the typical image library includes a standard image and a violation image corresponding to each of preset cargo categories respectively.

In an exemplary embodiment of the present disclosure, the performing image retrieval on the radiation image to be analyzed in the typical image library includes: extracting features of the radiation image to be analyzed; compare the features of the radiation image to be analyzed with the standard image and the violation image in the typical image library; and obtain a standard image and/or a violation image confirming to the features of the radiation image.

In an exemplary embodiment of the present disclosure, the method further includes: obtaining similarity between the standard image and/or the violation image, and the radiation image to be analyzed, according to the comparison with the standard image and/or the violation image similar to the features of the radiation image to be analyzed.

In an exemplary embodiment of the present disclosure, the acquiring a standard image and/or detailed customs declaration information of the standard image according to the customs declaration information of the radiation image to be analyzed includes: performing relationship retrieval or full-text retrieval on the customs declaration information of the radiation image to be analyzed in a customs declaration information library.

In an exemplary embodiment of the present disclosure, the method further includes: comparing the standard image and/or the detailed customs declaration information of the standard image with the radiation image to be analyzed, to obtain a matching degree therebetween.

In an exemplary embodiment of the present disclosure, the returning at least one image type of information according to a preset confidence level includes: extracting features of the radiation image to be analyzed; analyzing a cargo category included by a scanned cargo corresponding to the radiation image to be analyzed according to the features of the radiation image to be analyzed, to obtain cargo classification information of the radiation image to be analyzed.

In an exemplary embodiment of the present disclosure, the returning at least one type of image information according to a preset confidence level includes: establishing an intelligent image recognition model according to the typical image library; obtaining a suspect coefficient of the radiation image to be analyzed according to the intelligent image recognition model; and comparing the suspect coefficient of the radiation image to be analyzed with a preset threshold value, to judge whether or not a scanned cargo corresponding to the radiation image to be analyzed is suspicious.

In an exemplary embodiment of the present disclosure, the intelligent image recognition model includes at least two of a waste paper model, a waste metal model, a waste plastic model, a cigarette model and a liquor model.

In an exemplary embodiment of the present disclosure, the method further includes: automatically providing an analysis result of the radiation image to be analyzed according to the historical image and the standard image and/or the detailed customs declaration information of the standard image.

In an exemplary embodiment of the present disclosure, the method further includes: collecting feedback information of the analysis result from a user; and automatically updating the typical image library based on the feedback information.

In an exemplary embodiment of the present disclosure, the method further includes: displaying the radiation image to be analyzed in respective regions according to the cargo category and providing at least one cargo category for each region through intelligent analysis.

According to an aspect of the present disclosure, there is provided a system for assisting analysis of a radiation image, including: a processor; and a memory for storing instructions executable by the processor, wherein the processor is configured to acquire a radiation image to be analyzed; acquire customs declaration information of the radiation image to be analyzed; store typical images corresponding to each of preset cargo categories respectively; store a standard image and/or detailed customs declaration information of the standard image; acquire a feature-matched historical image from a typical image library according to the radiation image to be analyzed; and/or acquire a standard image and/or detailed customs declaration information of the standard image according to the customs declaration information of the radiation image to be analyzed.

In an exemplary embodiment of the present disclosure, the processor is further configured to: acquire risk prompt information of the radiation image to be analyzed.

In an exemplary embodiment of the present disclosure, the processor is further configured to: perform image retrieval on the radiation image to be analyzed in the typical image library.

In an exemplary embodiment of the present disclosure, the processor is further configured to: train the image retrieval by using an intelligent learning algorithm.

In an exemplary embodiment of the present disclosure, the processor is further configured to: return at least one type of image information according to a preset confidence level.

In an exemplary embodiment of the present disclosure, the typical image library includes a standard image and a violation image corresponding to each of preset cargo categories respectively.

In an exemplary embodiment of the present disclosure, the processor is further configured to: extract features of the radiation image to be analyzed; compare the features of the radiation image to be analyzed with the standard image and the violation image in the typical image library, and obtain a standard image and/or a violation image confirming to the features of the radiation image.

In an exemplary embodiment of the present disclosure, the processor is further configured to: obtain similarity between the standard image and/or the violation image, and the radiation image to be analyzed, according to the comparison with the standard image and/or the violation image similar to the features of the radiation image to be analyzed.

In an exemplary embodiment of the present disclosure, the processor is further configured to: perform relationship retrieval or full-text retrieval on the customs declaration information of the radiation image to be analyzed in a customs declaration information library.

In an exemplary embodiment of the present disclosure, the processor is further configured to: compare the standard image and/or the detailed customs declaration information of the standard image with the radiation image to be analyzed, to obtain a matching degree therebetween.

In an exemplary embodiment of the present disclosure, the processor is further configured to: extract features of the radiation image to be analyzed; and analyze a cargo category included by a scanned cargo corresponding to the radiation image to be analyzed according to the features of the radiation image to be analyzed, to obtain cargo classification information of the radiation image to be analyzed.

In an exemplary embodiment of the present disclosure, the processor is further configured to: establish an intelligent image recognition model according to the typical image library; obtain a suspect coefficient of the radiation image to be analyzed according to the intelligent image recognition model; and compare the suspect coefficient of the radiation image to be analyzed with a preset threshold value, to judge whether or not a scanned cargo corresponding to the radiation image to be analyzed is suspicious.

In an exemplary embodiment of the present disclosure, the processor is further configured to: automatically provide an analysis result of the radiation image to be analyzed according to the historical image and the standard image and/or the detailed customs declaration information of the standard image.

In an exemplary embodiment of the present disclosure, the processor is further configured to: collect feedback information of the analysis result from a user, and automatically update the typical image library based on the feedback information.

According to a method of assisting analysis of a radiation image and a system using the same of the present disclosure, it is possible to provide the user with necessary judgment basis by collecting a large number of historical cargo characteristics, customs declaration cargo data and related radiation images, and performing multi-dimensional combination, which may effectively help the user to improve the speed to detect and analyze the radiation images, especially in the case of a large number of cargos to be detected, and reduce the complexity of analysis and error judgment rate to a certain extent at the same time.

In addition, according to the scheme of the present disclosure, the system adopts advanced system integration technology, analyzes the radiation images and customs declaration form information in depth, compares with a mass of typical images, uses the advanced retrieval engine and algorithmic computing technology, to provide an automatic study and judgment function for machine inspection images.

BRIEF DESCRIPTION OF THE DRAWINGS

The above and other features and advantages of the present disclosure will become apparent from exemplary embodiments thereof described in detail with reference to accompanying drawings.

DETAILED DESCRIPTION

The exemplary embodiments will be described more fully with reference to the accompanying drawings now. However, the exemplary embodiments may be implemented in various manners, and should not be understood as limited to the embodiments set forth herein. Instead, these embodiments are provided to make the present disclosure more thorough and complete, and to fully convey the concept of the exemplary embodiments to those skilled in the art. Throughout the accompanying drawings, the same symbol represents the same or similar part, and thus the repeated description will be omitted.

In addition, the features, structures or characteristics described may be combined in one or more embodiments in any suitable way. In the following description, more specific details are provided to enable thorough understanding of the embodiments of the present disclosure. However, it should be appreciated by those skilled in the art that the technical solution of the present disclosure may be practiced without one or more of the particular details or may be practiced with other methods, components, materials, devices or steps and so on. In some cases, known structures, methods, devices, implementation, material or operation will not be illustrated in detail to avoid obscuration of aspects of the present disclosure.

Figure 1:
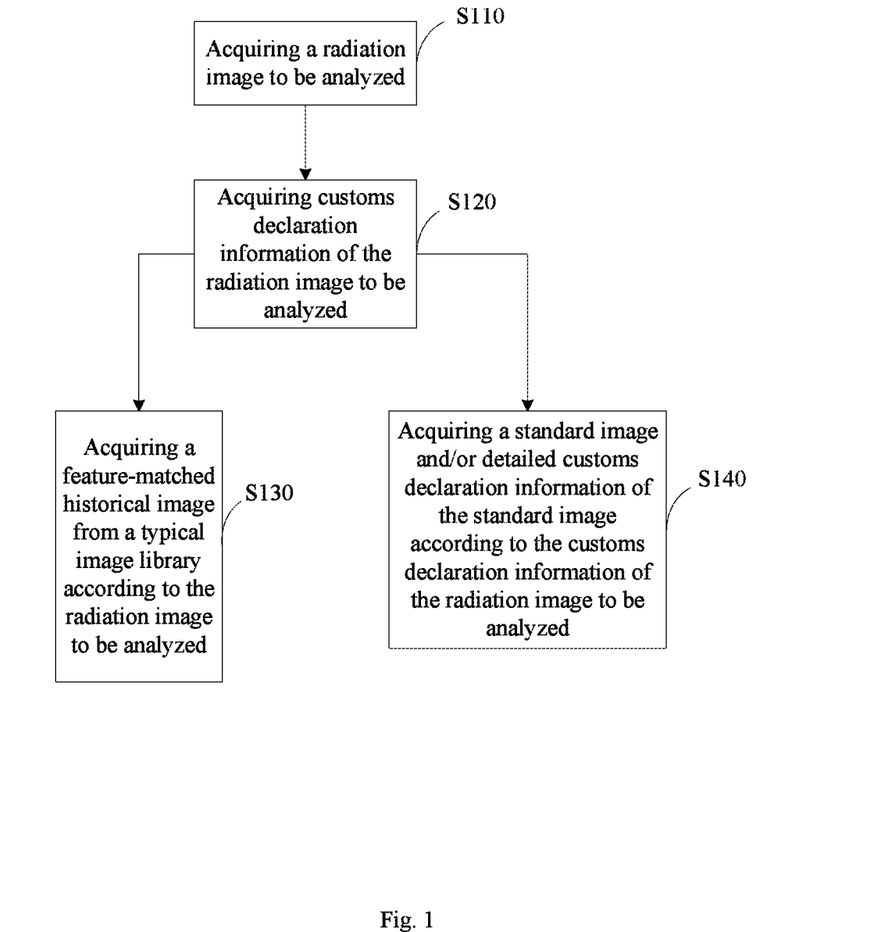
FIG. 1 shows a flow chart of a method of assisting analysis of a radiation image according to an exemplary embodiment of the present disclosure.

FIG. 1 shows a flow chart of a method of assisting analysis of a radiation image according to an exemplary embodiment of the present disclosure.

As shown in FIG. 1, at step S110, a radiation image to be analyzed is acquired.

In some embodiments, a radiation image being analyzed may be obtained from a radiation image analysis workstation or an image inspection station by calling a corresponding interface, to be served as a radiation image to be analyzed. The radiation image to be analyzed of the radiation image analysis workstation or the image inspection station may be generated by a radiation imaging apparatus. In other embodiments, it is also possible to directly import the radiation image to be analyzed directly from the local, to be served as the radiation image to be analyzed. The present disclosure is not limited to the source of the radiation image to be analyzed.

At step S120, customs declaration information of the radiation image to be analyzed is acquired.

In some embodiments, corresponding customs declaration information of the radiation image to be analyzed may be obtained by calling an interface docked with a customs core business system (e.g., an H2010 system in China). Of course, the present disclosure is not limited thereto.

The interface of the docking customs core business system may use an EDI (Electronic Data Interchange) interface. The EDI is an international standard introduced by the International Standardization on Organization (ISO), which refers to an electronic transmission method from computer to computer for a structurized transaction processing or message format formed in accordance with a recognized standard for business or administrative transactions, and also refers to a computer-readable business language, for example, exchange of data such as purchase orders, packing lists, bills of lading or the like in international trade.

In an exemplary embodiment, the customs declaration information may include cargo classification information, a cargo name, a scanned serial number, a customs declaration form number, a container number or the like of the scanned cargo. The cargo classification information may classify the cargos into 22 categories according to HSCODE in the "Declaration Catalog of Import and Export Cargo Norms of the China Customs".

At step S130, a feature-matched historical image is acquired from a typical image library according to the radiation image to be analyzed.

In an exemplary embodiment, the typical image library includes a standard image and a violation image corresponding to each of preset cargo categories respectively.

In the embodiment, the standard image may be a radiation image having a typical representative property and conforming to the standard and selected from a mass of original radiation images with respect to a specific kind of cargo category, such as cigarettes. Each of the cargo category may include at least one standard image. Usually, for the accuracy of expression, a variety of standard images of one cargo category may be selected. For example, a plurality of pieces of standard images of cigarettes may be selected in one container according to different amount of the cigarettes, alternatively, a plurality of pieces of standard images of cigarettes may be selected according to different placing positions of the cigarettes.

The violation image is an image, a part of which corresponds to any cargo category being not consistent with the declared cargo category, which may be a radiation image having a typical representative property and non-conforming to the standard and selected from a mass of original radiation images with respect to a specific kind of cargo category, such as automobiles. For example, the violation image may be a detected violative radiation image in the history which has been declared to be an automobile but the cargo in the container is not an automobile in fact.

In an exemplary embodiment of the present disclosure, the acquiring a feature-matched historical image from a typical image library according to the radiation image to be analyzed includes: performing image retrieval on the radiation image to be analyzed in the typical image library.

In an exemplary embodiment of the present disclosure, the performing image retrieval on the radiation image to be analyzed in the typical image library further includes: training the image retrieval by using an intelligent learning algorithm.

In an exemplary embodiment of the present disclosure, the performing image retrieval on the radiation image to be analyzed in the typical image library includes: returning at least one type of image information according to a preset confidence level.

In an exemplary embodiment of the present disclosure, the returning at least one type of image information according to a preset confidence level includes: extracting features of the radiation image to be analyzed; analyzing a cargo category included by a scanned cargo corresponding to the radiation image to be analyzed according to the features of the radiation image to be analyzed, to obtain cargo classification information of the radiation image to be analyzed.

In the embodiment, the identification of the cargo category included by the scanned cargo corresponding to the radiation image to be analyzed may be obtained by detecting the atomic number information of the material of the scanned cargo. For example, the scanned cargos are identified as organics, light metals, inorganics or heavy metals or the like.

In an exemplary embodiment of the present disclosure, the returning at least one image type of information according to a preset confidence level includes: establishing an intelligent image recognition model according to the typical image library; obtaining a suspect coefficient of the radiation image to be analyzed according to the intelligent image recognition model; and comparing the suspect coefficient of the radiation image to be analyzed with a preset threshold value, to judge whether or not a scanned cargo corresponding to the radiation image to be analyzed is suspicious.

In an exemplary embodiment of the present disclosure, the intelligent image recognition model includes at least two of a waste paper model, a waste metal model, a waste plastic model, a cigarette model, and a liquor model.

For example, a three-waste (a waste paper, waste metal and waste plastic) identification algorithm and a corresponding three-waste image feature library may be preset in the system, to detect whether or not the container contains the three wastes and judge whether or not it is the waste paper, waste metal or waste plastic. A cigarette identification algorithm and a corresponding cigarette image feature library may also be preset in the system, to detect whether or not the container contains the cigarettes. A liquor identification algorithm and a corresponding liquor image feature library may also be preset in the system, to detect whether or not the container contains the bottled liquor.

The following is a case where the detection of cigarettes is exemplified, the detection of other illegal items, prohibited items, and feature extraction of radiation images or the like may be referred to the detection method of cigarettes.

At first, a radiation image to be analyzed is acquired; a cigarette model is established, wherein the step of establishing a cigarette model includes acquisition of a cigarette image library, feature extraction, training, and cigarette model generation; and automatic detection is performed, the step of automatic detection includes feature extraction of the radiation image to be analyzed, judgment, and marking the suspect region.

In the embodiment, the cigarette model is to model an image mode of the cigarette, so extraction of the image mode is the focus of the algorithm. Without loss of generality, different packaging manners, placement methods, and the number of cigarettes will cause difference of the cigarette images. Among them, the homoplasy of the packaging manners makes the problem simpler, and a small number of modes may generalize the vast majority of situations. The difference of the numbers will result in change of image gray and stripe intensity, which needs to be overcome in the feature extraction algorithm. The impact brought by the placement manner is quite great, and the placement manner may be come down to three modes. Without loss of generality, the placement manner of cigarettes may be any one of the six placement manners. Because the container is generally scanned by using fan-shaped beams of rays, a horizontal edge is stereoscopically superimposed in a direction of rays, such that the cigarettes present vertical stripes with different widths. It may be summarized into following three modes, namely: wide stripes, slightly narrow stripes, and narrow stripes, according to the vertical striped textures of cigarettes. On basis of the above analysis, three kinds of cigarette modes with different placement manners are put forward, and a model is established by using an algorithm.

The cigarette model includes feature extraction algorithms and classifiers. According to the above analysis, the process of establishing a model is: establishing a cigarette detection database. A considerable number of cigarette images is collected, such that six placement manners among them are evenly distributed. The number is evenly distributed under a condition of at least one box, and at most occupying the width of the container. In a two-dimensional image obtained by scanning, taking the box as a unit, the rectangular cigarette region is manually marked. All images in marked rectangular blocks form a positive class sample library. In addition, other categories of cargos are randomly scanned, to form a negative class sample library. Features of images in all cigarette regions are extracted, to form three feature sets under three modes. Three negative sample sets with sample capacities large enough are randomly selected from the negative samples, and features are extracted. A classifier is trained for the obtained positive and negative samples. The classifier may be optimized by using existing algorithms in the machine learning and pattern recognition field. For example, the classifier is obtained by borrowing Boosting ideas, i.e., constantly discarding easy samples (easy negative), adding new random samples, repeating until an error rate is low enough or the algorithm converges. After the cigarette model is established, the automatic cigarette detection is performed on the radiation image by using the established cigarette model.

The automatic detection process is actually a subset of the model establishment process: for the radiation image to be analyzed, traversing pixel points within each region of interest, extracting neighborhood images surrounding the point, extracting the features, classifying and judging, and then obtaining whether the point is the cigarette region, and a confidence level of this conclusion.

After the result of whether or not each pixel is a cigarette suspicious region is obtained, the cigarette region may be obtained by extracting a connected region. A schematic diagram of cigarette detection is marked with a form of rectangular block.

In the detection process, if it is found by the inspection person that the algorithm detects no cigarette and marks the same, the algorithm adds the marked region into the positive sample. The re-training or incremental learning is conducted, to obtain a updated model.

In the above description, an example provides a general form of the method. In the level of specifically implementing the algorithm, a variety of existing algorithms may be selected and used. For example, each of HOG, DPM, and Deep Learning mentioned above may be directly applied to the present disclosure. The detection function may be realized by extracting features of the positive and negative samples and classifying the same. Specifically, in the aspect of image feature extraction, various gradient-based descriptors, texture descriptors or the like, such as HOG, LBP-Local Binary Image, Maximum Response Sets (or called as MR8) may be used. In addition, BOW-Bag of Words, Texton, Sparse Representation or the like may be used to perform structural feature processing. In the aspect of classifiers, a variety of linear classifiers, non-linear classifiers, integrated classifiers, neural networks may be used, such as Fisher classifiers, support vector machines, Boosting, random forests and multi-layer perceptron.

Without loss of generality, an embodiment of using a specific algorithm is provided herein. However, it will be understood that those skilled in the art may alter or replace specific algorithms in the embodiments in accordance with the teachings of the present disclosure, without departing from the concept of the present disclosure.

In an exemplary embodiment, the performing image retrieval on the radiation image to be analyzed in the typical image library includes: extracting features of the radiation image to be analyzed; comparing the features of the radiation image to be analyzed with the standard image and the violation image in the typical image library; and obtaining a standard image and/or a violation image confirming to the features of the radiation image.

The feature extraction method may use SIFT (Scale-invariant feature transform), MR8 and other operators to obtain a plurality of features, and then use the Feature Fusion or Decision Fusion method to fuse the plurality of features, to acquire key features.

In an exemplary embodiment, the method further includes: obtaining similarity between the standard image and/or the violation image, and the radiation image to be analyzed, according to the comparison with the standard image and/or the violation image similar to the features of the radiation image to be analyzed.

At step S140, a standard image and/or detailed customs declaration information of the standard image is acquired according to the customs declaration information of the radiation image to be analyzed.

In an exemplary embodiment, the acquiring a standard image and/or detailed customs declaration information of the standard image according to the customs declaration information of the radiation image to be analyzed includes: performing relationship retrieval or full-text retrieval on the customs declaration information of the radiation image to be analyzed in a customs declaration information library.

In an exemplary embodiment, the method further includes: comparing the standard image and/or the detailed customs declaration information of the standard image with the radiation image to be analyzed, to obtain a matching degree therebetween.

It should be noted that the step S130 and step S140 mentioned above may simultaneously parallelly exist in the method of assisting analysis of a radiation image described in embodiments of the present disclosure, alternatively, only one of the two steps may be performed.

In an exemplary embodiment, the method further includes: acquiring risk prompt information of the radiation image to be analyzed.

In some embodiments, the risk prompt information of the radiation image to be analyzed may be obtained by docking with other business systems of the customs, such as a customs risk management system. In other embodiments, the risk prompt information may also be obtained by docking with other information systems. Alternatively, a set of risk management system may also be created by oneself according to massive historical accumulation data. A corresponding risk level or risk prompt may be set according to a category of a declared cargo and a cargo name declared on the customs declaration form, a declarant and a historical behavior record. The risk management system herein may also be other third-party systems, such as an enterprise credit information query system, a personal credit query system and so on. The present disclosure is not limited thereto.

In the embodiment, the risk prompt information may include a risk level.

For example, at first, it may define which information of the supervised object to be used as elements of the risk analysis and define a rule for the risk analysis. Then, a risk level of the supervised object is analyzed based on the defined elements, rules and the obtained information of the supervised object. Herein, the risk level may be set as needed, such as classified into a high, medium, low risk level, alternatively, risky or no-risk, and so on. For example, for a cargo, a cargo category, a country of origin, a shipper or the like may be served as the risk analysis element. The risk element is defined to be in the risk of what degree under what condition. For example, if the enterprise had smuggled violation, the business of the enterprise is classified as high risk. Corresponding to the risk, the business meeting a credible rule condition is considered to be no-risk or low risk, such as a large enterprise with no smuggling illegal records.

In an exemplary embodiment, the method further includes: automatically providing an analysis result of the radiation image to be analyzed according to the historical image and the standard image and/or the detailed customs declaration information of the standard image.

In the embodiment, the analysis result may include a proposal of releasing or a proposal of unpacking. For example, when it is judged that a suspect coefficient of the current radiation image to be analyzed is lower than a preset threshold value, it is determined that no prohibited item (for example, any one of cigarettes, liquors, and three-waste items) exists in the scanned cargo corresponding to the radiation image to be analyzed, and the cargo classification of the radiation image to be analyzed is consistent with the cargo category declared in the customs declaration form, and when no concealing or missing report occurs in the scanned cargo of the radiation image to be analyzed, the system may give an analysis result of the proposed releasing. However, if any one of prohibited items exists in the scanned cargo corresponding to the current radiation image to be analyzed, or if the cargo classification of the radiation image to be analyzed is inconsistent with the cargo category declared in the customs declaration form, or a concealing or missing report occurs in the scanned cargo of the radiation image to be analyzed, the system may give an analysis result of proposed unpacking.

In addition to the above-mentioned cases, another case may also exist. That is, although the system gives the analysis result of proposed releasing on the current radiation image to be analyzed through intelligent analysis, for further safety, the above risk prompt information may also be bound, and the analysis result and the risk prompt information are simultaneously pushed to a user interface of the client for displaying in respective regions.

In an exemplary embodiment, the method further includes: collecting feedback information of the analysis result from a user; and automatically updating the typical image library based on the feedback information.

In an exemplary embodiment of the present disclosure, the method further includes: displaying the radiation image to be analyzed in respective regions according to the cargo category, and providing at least one cargo category for each region through intelligent analysis.

It is possible to perform color display according to the cargo category of the radiation image to be analyzed. For example, an orange color is applied to the organic matter, a green color is applied to the light metal, a blue color is applied to the inorganic, a purple color is applied to heavy metals, and so on.

It should be noted that the above image analysis and image retrieval may analyze or retrieve an entire radiation image, or a selected region of interest in the radiation image.

In the exemplary embodiment, the method of assisting analysis of a radiation image provided by the embodiment of the present disclosure adopts a server and client co-processing mechanism. The server is in charge of performing the synthetic operation of the matching degree and the similarity degree, and performing the binding logic of all the effective information. The client is in charge of the core analysis algorithm operation of the image features. Finally, through the processing integration of the server and the client, the analysis results will be automatically displayed in the user interface of the client.

For example, the client logs in a system by using an authorized account through an ordinary web browser. The radiation image to be analyzed and corresponding customs declaration information are imported by a manual manner or by a professional image analysis software, and an analysis request is issued. The server receives the analysis request, pre-caches the radiation image to be analyzed and corresponding customs declaration information, performs matching of a cargo code and of a typical image, and simultaneously informs the client for cooperative processing. The client receives the cooperative processing request, directly reads the radiation image to be analyzed and corresponding customs declaration information from the pre-cache, and calls a variety of identification algorithms for analysis. An analysis result completed by the client is returned to the server, and the server binds the multi-information. After the information binding is completed, a final result is returned to the client by a web server, and the final analysis result is displayed by the browser.

In an exemplary embodiment, the method further includes: performing classified management and maintenance of the typical images.

For example, at the beginning, the HS code of the customs tax regulation can be used as the basis for classification. The user may create, modify, delete, etc. the preset cargo classification.

In an exemplary embodiment, the method further includes: collecting the typical images and maintaining the typical images, for example, adding, modifying, deleting, importing, exporting, editing, publishing, etc. the standard images and violation images in the typical images. The maintenance of the typical images may be based on the HSCODE classification.

In an exemplary embodiment, the method further includes: analyzing the image quality, the retrieval quality, the quality of the image judgment or the like of the typical image library, and continuously improving the calculation correctness of the system.

In an exemplary embodiment, the method further includes: displaying the distribution and user usage of all current typical images, such as, the number of standard images and violation images, images under an edit status, an unpublished status and a published statue or the like under each category.

In an exemplary embodiment, the method further includes: managing the system user. For example, it may include addition, deletion, disable, modification, and role assignment of the user.

In an exemplary embodiment, the method further includes: recording an operation log performed by the user in use of the system. For example, it may include operations on images, files, system users, HSCODE classification, or the like.

In an exemplary embodiment, the method further includes: recording an access log of a user to the system. For example, it may include a login mode and an interface access mode.

In an exemplary embodiment, the method further includes: configuring a workstation, to configure and manage the image inspection station and its corresponding all-in-one machine.

In an exemplary embodiment, the method further includes: receiving different query requests issued by the client, querying an corresponding radiation image and affiliated information, caching the result, and returning back to the client browser for display. The display items may include: a typical image name, a scan serial number, a cargo category, a cargo name, a material category, a creator, a creation time, a typical image publishing status, a typical image source, a view count, and so on.

The method of assisting analysis of a radiation image provided by the embodiment of the present disclosure may clearly find out whether or not the customs declaration cargo is abnormal by comparing the image analysis and the customs declaration information, which helps to improve the efficiency of the artificial image judgment.

Figure 2:
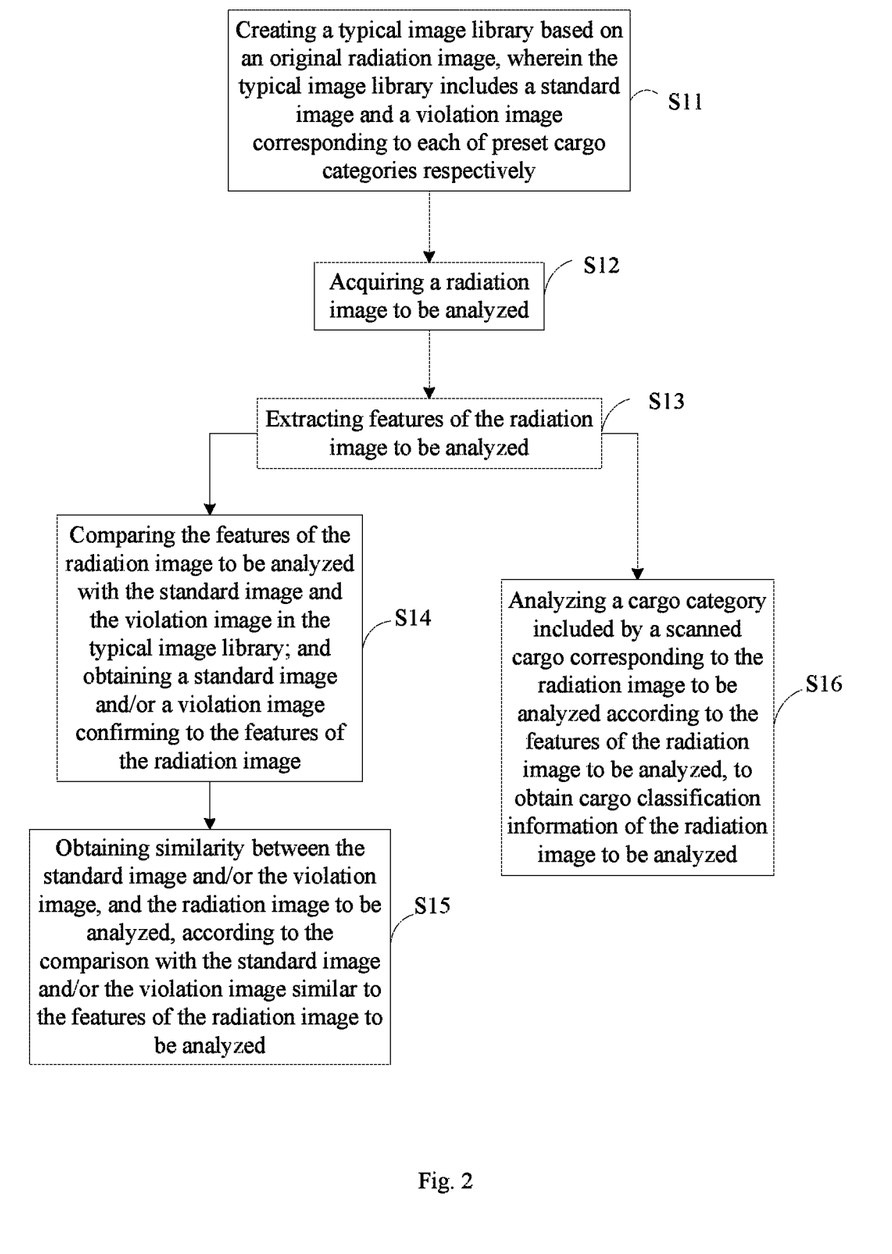
FIG. 2 shows a flow chart of image retrieval in a method of assisting analysis of a radiation image according to an exemplary embodiment of the present disclosure.

FIG. 2 shows a flow chart of image retrieval in a method of assisting analysis of a radiation image according to an exemplary embodiment of the present disclosure.

As shown in FIG. 2, at step S11, a typical image library is created based on an original radiation image, the typical image library including a standard image and a violation image corresponding to each of preset cargo categories respectively.

At step S12, a radiation image to be analyzed is acquired.

At step S13, features of the radiation image to be analyzed are extracted.

At step S14, the features of the radiation image to be analyzed are compared with the standard image and the violation image in the typical image library; and a standard image and/or a violation image confirming to the features of the radiation image is obtained.

At step S15, similarity between the standard image and/or the violation image, and the radiation image to be analyzed is obtained according to the comparison with the standard image and/or the violation image similar to the features of the radiation image to be analyzed.

At step S16, a cargo category included by a scanned cargo corresponding to the radiation image to be analyzed is analyzed according to the features of the radiation image to be analyzed, to obtain cargo classification information of the radiation image to be analyzed.

The method according to the embodiment of the present disclosure may also perform full-text retrieval in the customs declaration information library according to, for example, HSCODE in the customs declaration information, to search out a standard image under the HSCODE, and then provide reference for intelligent image judgment by comparing the radiation image to be analyzed and the standard image. This will be described in detail below with reference to FIG. 3.

Figure 3:
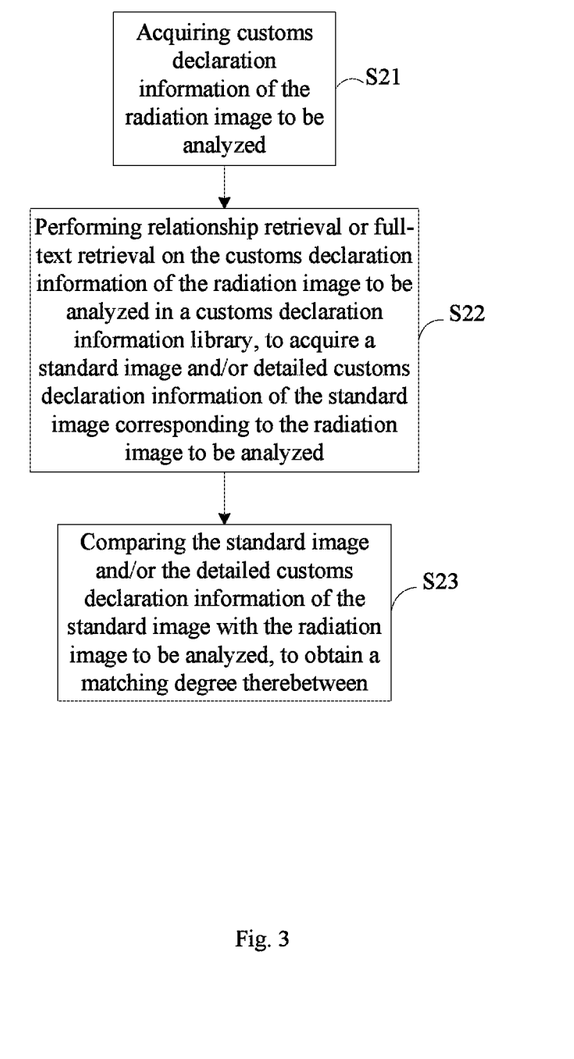
FIG. 3 shows a flow chart of text retrieval in a method of assisting analysis of a radiation image according to an exemplary embodiment of the present disclosure.

FIG. 3 shows a flow chart of text retrieval in a method of assisting analysis of a radiation image according to an exemplary embodiment of the present disclosure.

As shown in FIG. 3, at step S21, customs declaration information of the radiation image to be analyzed is acquired.

At step S22, relationship retrieval or full-text retrieval is performed on the customs declaration information of the radiation image to be analyzed in a customs declaration information library, to acquire a standard image and/or detailed customs declaration information of the standard image corresponding to the radiation image to be analyzed.

In the embodiment, the relationship retrieval may retrieve the standard image in the customs declaration information library, according to one or any combination of, for example, the image name, the scan serial number, the customs declaration form number, the cargo category, the cargo name, and other text information.

The full-text retrieval may retrieve the detailed customs declaration information of the standard image in the customs declaration information library according to the customs declaration information.

At step S23, the standard image and/or the detailed customs declaration information of the standard image is compared with the radiation image to be analyzed, to obtain a matching degree therebetween.

The embodiment of the present disclosure performs the full-text retrieval in the customs declaration information library by acquiring customs declaration information of the radiation image to be analyzed, extracts a standard image confirming to the customs declaration information such as HSCODE, the name of the cargo or the like, and obtains the detailed customs declaration information of the coincident standard image from the customs declaration system through for example, EDI, and then analyzes whether or not the features of the current radiation image to be analyzed are consistent with the features of the declared cargo, and returns the analysis results for reference of the user.

Figure 4:
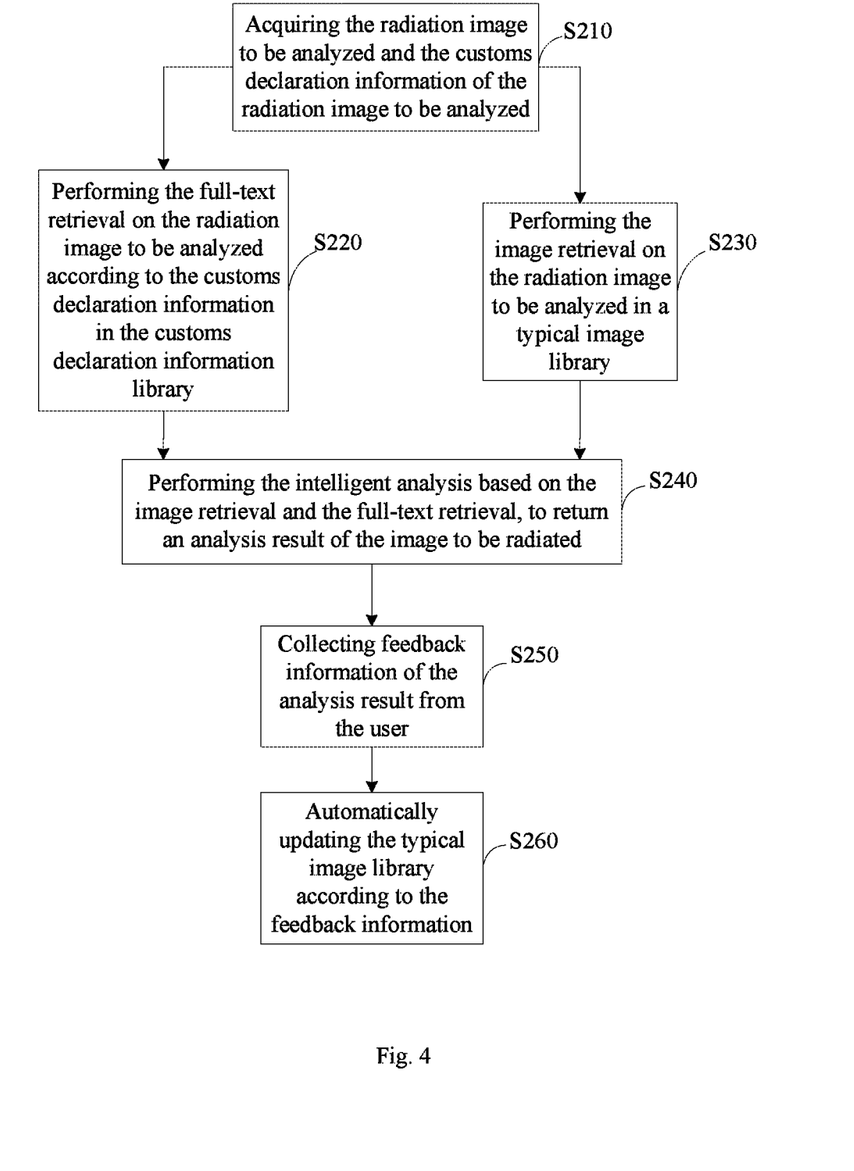
FIG. 4 shows a flow chart of a method of assisting analysis of a radiation image according to another exemplary embodiment of the present disclosure.

FIG. 4 shows another flow chart of a method of assisting analysis of a radiation image according to an exemplary embodiment of the present disclosure.

As shown in FIG. 4, at step S210, the radiation image to be analyzed and the customs declaration information of the radiation image to be analyzed are acquired.

At step S220, the full-text retrieval is performed on the radiation image to be analyzed according to the customs declaration information in the customs declaration information library.

At step S230, the image retrieval is performed on the radiation image to be analyzed in a typical image library.

At step S240, the intelligent analysis is performed based on the image retrieval and the full-text retrieval, to return an analysis result of the image to be radiated.

At step S250, feedback information of the analysis result from the user is collected.

At step S260, the typical image library is automatically updated according to the feedback information.

In the embodiment of the present disclosure, the user may feedback the accuracy level of the analysis through the interface. By collecting the feedback information of the analysis result, for each image that has been analyzed intelligently, the system will filter the image according to the radiation image information and the user feedback information and then automatically add the image into the typical image library. The algorithm correctness of the system depends on the accumulation of quantity of the typical image library. The larger the quantity is, the more accurate the extracted image feature is, and the higher the correct rate of the algorithm will be.

Figure 5:
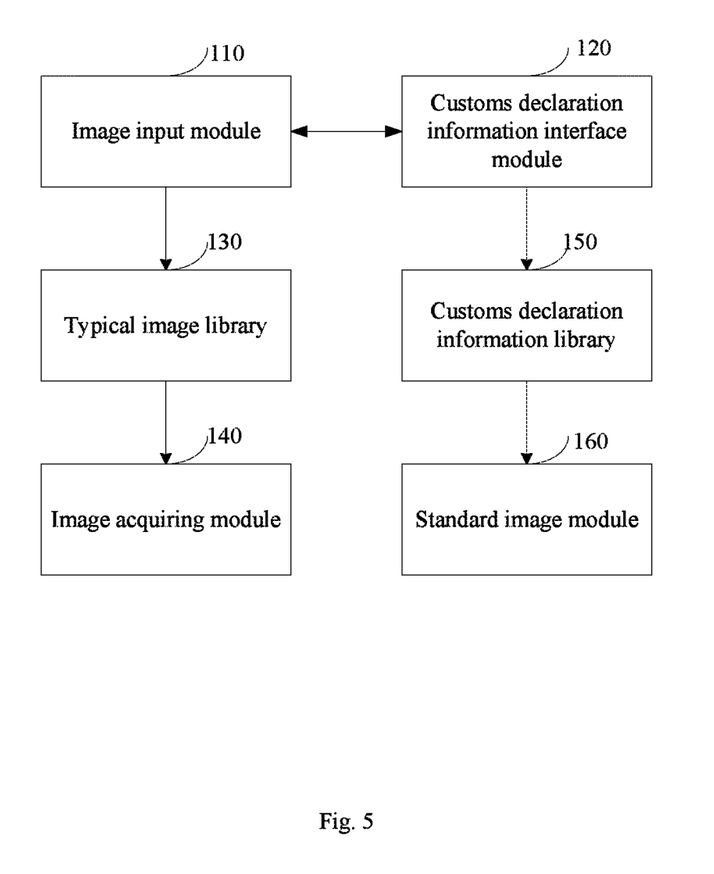
FIG. 5 shows a block diagram of a system for assisting analysis of a radiation image according to an exemplary embodiment of the present disclosure.

FIG. 5 shows a block diagram of a system for assisting analysis of a radiation image according to an exemplary embodiment of the present disclosure.

As shown in FIG. 5, the system includes: an image input module 110, a customs declaration information interface module 120, a typical image library 130, an image acquiring module 140, a customs declaration information library 150 and/or a standard image module 160.

In the embodiment, the image input module 110 is configured to acquire a radiation image to be analyzed.

The customs declaration information interface module 120 is configured to acquire customs declaration information of the radiation image to be analyzed.

The typical image library 130 is configured to store typical images corresponding to each of preset cargo categories respectively.

The customs declaration information library 150 is configured to store a standard image and/or detailed customs declaration information of the standard image.

The image acquiring module 140 is configured to acquire a feature-matched historical image from a typical image library according to the radiation image to be analyzed.

The standard image module 160 is configured to acquire a standard image and/or detailed customs declaration information of the standard image according to the customs declaration information of the radiation image to be analyzed.

In an exemplary embodiment, the system further includes: a risk management module, configured to acquire risk prompt information of the radiation image to be analyzed.

In an exemplary embodiment, the image acquiring module 140 includes: an image retrieval unit, configured to perform image retrieval on the radiation image to be analyzed in the typical image library.

In an exemplary embodiment, the image retrieval unit includes: a trainer, configured to train the image retrieval by using an intelligent learning algorithm.

In the embodiment, the trainer may be deployed separately and run separately, to ensure that the system does not affect the efficiency of the other modules during the extraction of the features.

In an exemplary embodiment, the image acquiring module 140 includes: an image information acquiring unit, configured to return at least one type of image information according to a preset confidence level.

In an exemplary embodiment, the typical image library includes a standard image and a violation image corresponding to each of preset cargo categories respectively.

In an exemplary embodiment, the image retrieval unit includes: a feature extracting sub-unit, configured to extract features of the radiation image to be analyzed; compare the features of the radiation image to be analyzed with the standard image and the violation image in the typical image library; and obtain a standard image and/or a violation image confirming to the features of the radiation image.

In an exemplary embodiment, the system further includes: a first comparing unit, configured to obtain similarity between the standard image and/or the violation image, and the radiation image to be analyzed, according to the comparison with the standard image and/or the violation image similar to the features of the radiation image to be analyzed.

In an exemplary embodiment, the standard image module 160 includes: a text retrieval unit, configured to perform relationship retrieval or full-text retrieval on the customs declaration information of the radiation image to be analyzed in a customs declaration information library.

In an exemplary embodiment, the system further includes: a second comparing unit, configured to compare the standard image and/or the detailed customs declaration information of the standard image with the radiation image to be analyzed, to obtain a matching degree therebetween.

In an exemplary embodiment, the image information acquiring unit includes: a feature extracting sub-unit, configured to extract features of the radiation image to be analyzed; a classification information acquiring sub-unit, configured to analyze a cargo category included by a scanned cargo corresponding to the radiation image to be analyzed according to the features of the radiation image to be analyzed, to obtain cargo classification information of the radiation image to be analyzed.

In an exemplary embodiment, the image information acquiring unit includes: a model establishing sub-unit, configured to establish an intelligent image recognition model according to the typical image library; a calculation sub-unit, configured to obtain a suspect coefficient of the radiation image to be analyzed according to the intelligent image recognition model; and a third comparing sub-unit, configured to compare the suspect coefficient of the radiation image to be analyzed with a preset threshold value, to judge whether or not a scanned cargo corresponding to the radiation image to be analyzed is suspicious.

In an exemplary embodiment, the system further includes: an analysis result acquiring module, configured to automatically provide an analysis result of the radiation image to be analyzed according to the historical image and the standard image and/or the detailed customs declaration information of the standard image.

In an exemplary embodiment, the system further includes: a feedback self-learning module, configured to collect feedback information of the analysis result from a user, and automatically update the typical image library based on the feedback information.

In an exemplary embodiment, the system further includes: a classifying and managing module, configured to perform classified manage and maintain on the typical images of the cargo.

In an exemplary embodiment, the system further includes: a typical image library management module, configured to collect typical images and maintain the typical images.

The system reserves a standard integrated interface, to data dock with the customs business system, intelligent cloud inspection platform, customs control command center and other products, to provide an integrated solution for the customs. It may also dock with an intelligent check and release system, and with other systems to be accessed later.

In an exemplary embodiment, the system for assisting analysis of a radiation image may be a system of hardware and/or software integration, for example, an all-in-one machine. The system may be deployed in the form of a server and/or a client, which may include a processor; and a memory for storing instructions executable by the processor, wherein the processor is configured to implement the above modules to perform the above steps of methods of assisting analysis of a radiation image of the present disclosure, and the all-in-one machine may be configured according to the number of the image inspection stations. The system may provide complete auxiliary analysis functions, including the typical image library, HSCODE management and a function of finding an image with an image. The system supports image assistant analysis of a variety of substance identification, such as, three-wastes, cigarettes and liquor, or the like. The system has a thorough user authorization management mechanism. At the same time, the entire system also has the ability of self-learning, which may sustainably improve the ability of intelligent analysis.

In an exemplary embodiment, the system further includes: a system management module, configured to perform user management, log management, classification management or the like. The user management supports hierarchical management on the users, and has functions of adding, modifying, deleting users and so on. An operation log and access log module records operations of adding, deleting, modifying, importing and other operation performed by the user to the system, and also records the user online or offline time to support the exporting and clearing operations on the log.

According to the system for assisting analysis of a radiation image provided by the embodiment of the present disclosure, a feature library and a typical image library of a specific cargo category is formed by analyzing features of the radiation image to be analyzed and its corresponding customs declaration information, a mass of historical radiation images and the customs declaration information. Through comprehensive analysis and judgment conducted by combining with technologies such as image comparison, customs declaration data comparison and full-text retrieval, a corresponding analysis result and prompt information are automatically provided, to find out prohibited and banned items, which solves the problem of error inspection and missing inspection caused by lack of inspectors or lack of ability of the inspectors or other illegal behaviors, such that the overall efficiency of the customs inspection is improved. The system also improves the inspection rate of the customs while improving the clearance rate of cargos. Meanwhile, as the continuous accumulation of data, the feature library will also be continuously enriched, which may increase the correct rate of the final analysis and identification.

While the present disclosure has been illustrated and described in detail in the drawings and foregoing description, the illustration and description are to be regarded as illustrative or exemplary but not restrictive. The present disclosure is not limited to the disclosed embodiments. Those skilled in the art may understand and implement other variations of the disclosed embodiments from the study of the drawings, the disclosed contents and the appended claims, while practicing the claimed present disclosure.

In the claims, the word "comprising" does not exclude other elements or steps, and "a" does not exclude plural. A single element or other units may implement some functions described in the claims. The mere fact that certain measures are described in mutually different dependent claims does not indicate that a combination of these measures cannot be used advantageously. Any reference signs in the claims should not be construed as limiting the scope.

From the foregoing detailed description, it will be readily understood by those skilled in the art that the systems and methods according to embodiments of the present disclosure have one or more of the following advantages.

The present disclosure provides a method of assisting analysis of a radiation image and a system using the same, which may automatically give the analysis result and automatically provide the historical experience involved in the image inspection for reference of the user, which will help the user to gradually convert from the artificial inspection at the present stage to the automatic inspection. At the same time, the system, as an auxiliary business system of the radiation image inspection, informs the user system the automatic image inspection result through simple and intuitive display technology, such that it provides users job sharing to the greatest extent, so as to facilitate the user quickly completing the image inspection work. The promotion and application of the method and system will greatly enhance the ability of the customs to beat illegal smuggling and regulate the import and export order of trades.

The exemplary embodiments of the present disclosure have been illustrated and described above in detail. It should be understood that, the present disclosure is not limited to the embodiments disclosed. Instead, the present disclosure intends to cover all the alteration and equivalent replacement within the spirit and scope of the appending claims.

What is claimed is:

1. A method of assisting analysis of a radiation image, comprising:
    acquiring a radiation image to be analyzed;
    acquiring customs declaration information of the radiation image to be analyzed;
    acquiring a feature-matched historical image from a typical image library according to the radiation image to be analyzed;
    selecting a cargo category from a plurality of cargo categories according to the customs declaration information of the radiation image to be analyzed;
    selecting a standard image from among a plurality of standard images associated with the selected cargo category; and
    acquiring the standard image selected and detailed customs declaration information of the standard image according to the customs declaration information of the radiation image to be analyzed, wherein the standard image is an image where cargo therein match the declared cargo category according to the detailed customs declaration information for the standard image.

2. The method of claim 1, further comprising:
    acquiring risk prompt information of the radiation image to be analyzed.

3. The method of claim 1, wherein the acquiring a feature-matched historical image from a typical image library according to the radiation image to be analyzed comprises:
    performing image retrieval on the radiation image to be analyzed in the typical image library.

4. The method of claim 3, wherein the performing image retrieval on the radiation image to be analyzed in the typical image library comprises:
    returning at least one type of image information according to a preset confidence level.

5. The method of claim 3, wherein the typical image library comprises a standard image and a violation image corresponding to each of preset cargo categories respectively, the violation image is a image where cargo therein does not match a respective declared cargo category.

6. The method of claim 5, wherein the performing image retrieval on the radiation image to be analyzed in the typical image library comprises:
    extracting features of the radiation image to be analyzed;
    comparing the features of the radiation image to be analyzed with the standard image and the violation image in the typical image library;
    obtaining the standard image and/or a violation image confirming to the features of the radiation image.

7. The method of claim 6, further comprising:
    obtaining similarity between the standard image and/or the violation image, and the radiation image to be analyzed, according to the comparison with the standard image and/or the violation image similar to the features of the radiation image to be analyzed.

8. The method of claim 1, further comprising:
    comparing the standard image and/or the detailed customs declaration information of the standard image with the radiation image to be analyzed, to obtain a matching degree therebetween.

9. The method of claim 4, wherein the returning at least one type of image information according to a preset confidence level comprises:
    establishing an intelligent image recognition model according to the typical image library;
    obtaining a suspect coefficient of the radiation image to be analyzed according to the intelligent image recognition model; and
    comparing the suspect coefficient of the radiation image to be analyzed with a preset threshold value, to judge whether or not a scanned cargo corresponding to the radiation image to be analyzed is suspicious.

10. The method of claim 9, wherein the intelligent image recognition model comprises at least two of a waste paper model, a waste metal model, a waste plastic model, a cigarette model and a liquor model.

11. The method of claim 1, further comprising:
    automatically providing an analysis result of the radiation image to be analyzed according to the historical image and the standard image and/or the detailed customs declaration information of the standard image.

12. The method of claim 11, further comprising:
    collecting feedback information of the analysis result from a user; and
    automatically updating the typical image library based on the feedback information.

13. A system for assisting analysis of a radiation image, comprising:
    a processor; and
    a memory for storing instructions executable by the processor,
    wherein the processor is configured to:
        acquire a radiation image to be analyzed;
        acquire customs declaration information of the radiation image to be analyzed;
        store typical images corresponding to each of preset cargo categories respectively;
        store a standard image and/or detailed customs declaration information of the standard image;
        acquire a feature-matched historical image from a typical image library according to the radiation image to be analyzed;
        selecting a cargo category from a plurality of cargo categories according to the customs declaration information of the radiation image to be analyzed;
        selecting a standard image from among a plurality of standard images associated with the selected cargo category; and
        acquire the standard image selected and detailed customs declaration information of the standard image according to the customs declaration information of the radiation image to be analyzed, wherein the standard image is an image where cargo therein match the declared cargo category according to the detailed customs declaration information for the standard image.

14. The system of claim 13, wherein the processor is further configured to:
acquire risk prompt information of the radiation image to be analyzed.

15. The system of claim 13, wherein the processor is further configured to:
perform image retrieval on the radiation image to be analyzed in the typical image library.

16. The system of claim 13, wherein the processor is further configured to:
return at least one type of image information according to a preset confidence level.

17. The system of claim 15, wherein the typical image library comprises a standard image and a violation image corresponding to each of preset cargo categories respectively, the violation image is a image where cargo therein does not match a respective declared cargo category.

18. The system of claim 17, wherein the processor is further configured to:
extract features of the radiation image to be analyzed; and
compare the features of the radiation image to be analyzed with the standard image and the violation image in the typical image library, to obtain a standard image and/or a violation image confirming to the features of the radiation image.

19. The system of claim 18, wherein the processor is further configured to:
obtain similarity between the standard image and/or the violation image, and the radiation image to be analyzed, according to the comparison with the standard image and/or the violation image similar to the features of the radiation image to be analyzed.

20. The system of claim 13, wherein the processor is further configured to:
compare the standard image and/or the detailed customs declaration information of the standard image with the radiation image to be analyzed, to obtain a matching degree therebetween.

* * * * *